United States Patent
Park

(10) Patent No.: US 11,155,497 B2
(45) Date of Patent: Oct. 26, 2021

(54) VACUUM INSULATION GLASS PANEL ASSEMBLY MANUFACTURING METHOD AND APPARATUS

(71) Applicant: Je Il Park, Bucheon-si (KR)

(72) Inventor: Je Il Park, Bucheon-si (KR)

(*) Notice: Subject to any disclaimer, the term of this patent is extended or adjusted under 35 U.S.C. 154(b) by 418 days.

(21) Appl. No.: 16/334,480

(22) PCT Filed: Sep. 19, 2017

(86) PCT No.: PCT/KR2017/010232
§ 371 (c)(1),
(2) Date: Mar. 19, 2019

(87) PCT Pub. No.: WO2018/056663
PCT Pub. Date: Mar. 29, 2018

(65) Prior Publication Data
US 2019/0210917 A1    Jul. 11, 2019

(30) Foreign Application Priority Data

Sep. 20, 2016 (KR) .......................... 10-2016-0120047

(51) Int. Cl.
*C03C 27/10* (2006.01)
*E06B 3/667* (2006.01)
(Continued)

(52) U.S. Cl.
CPC ................ *C03C 27/10* (2013.01); *B32B 7/12* (2013.01); *B32B 17/10* (2013.01); *B32B 17/10036* (2013.01); *C03C 27/06* (2013.01); *E06B 3/6775* (2013.01); *E06B 3/6612* (2013.01); *E06B 3/6736* (2013.01); *E06B 3/67334* (2013.01); *E06B 3/67365* (2013.01); *E06B 3/67386* (2013.01); *F16L 59/065* (2013.01)

(58) Field of Classification Search
CPC .. E06B 3/6775; E06B 3/6733; E06B 3/67334; E06B 3/3736; E06B 3/67365; E06B 3/67386; F16L 59/065; C03C 27/10
See application file for complete search history.

(56) References Cited

U.S. PATENT DOCUMENTS 6,261,652 B1 * 7/2001 Poix ...................... E06B 3/6612
428/34

FOREIGN PATENT DOCUMENTS

JP        2003-192401 A       7/2003
KR   10-2013-0022535 A       3/2013
(Continued)

*Primary Examiner* — Donald J Loney
(74) *Attorney, Agent, or Firm* — Novick, Kim & Lee, PLLC; Jae Youn Kim

(57) ABSTRACT

Provided is a vacuum insulation glass panel assembly manufacturing method and apparatus. The vacuum insulation glass panel assembly manufacturing method includes an edge sealing step of sealing an edge of a glass panel assembly of glass panels spaced apart at a predetermined interval, and an exhaust port sealing step of causing a lid member to seal an exhaust port of the glass panel assembly formed so as to communicate with a space between the glass panels whose edges are sealed. A glass solder having a high melting point is used in the edge sealing step, and a glass solder having a low melting point is used in the exhaust port sealing step. A specially designed lid member closing device is used for exhaust port sealing.

4 Claims, 7 Drawing Sheets

(51) Int. Cl.
    *B32B 17/10*     (2006.01)
    *E06B 3/677*     (2006.01)
    *B32B 7/12*     (2006.01)
    *C03C 27/06*     (2006.01)
    *E06B 3/66*     (2006.01)
    *F16L 59/065*     (2006.01)
    *E06B 3/673*     (2006.01)

(56) References Cited

FOREIGN PATENT DOCUMENTS

| | | |
|---|---|---|
| KR | 10-2013-0076783 A | 7/2013 |
| KR | 10-1322585 B1 | 10/2013 |
| KR | 10-1442030 B1 | 9/2014 |
| KR | 10-2014-0120139 A | 10/2014 |
| WO | 2011-076166 A1 | 6/2011 |
| WO | 2014-183515 A1 | 11/2014 |
| WO | 2015-139251 A1 | 9/2015 |

\* cited by examiner

VACUUM INSULATION GLASS PANEL ASSEMBLY MANUFACTURING METHOD AND APPARATUS

TECHNICAL FIELD

The present invention relates to a vacuum insulation glass panel assembly manufacturing method and apparatus.

BACKGROUND ART

Techniques are being developed to reduce the energy loss that occurs during heating and cooling of buildings. In particular, most of the energy loss that occurs during heating and cooling of buildings is generated through windows. A vacuum insulation glass panel assembly has been developed to prevent energy loss through glass windows.

As a conventional method for manufacturing a vacuum insulation glass panel assembly, there is known a technique of connecting an exhaust pipe to an exhaust port of a glass panel assembly, evacuating a sealed space formed between a pair of glass panels through an exhaust pipe, and sealing the exhaust pipe. In the case of manufacturing a vacuum insulation glass panel assembly using an exhaust pipe, there is a problem that a defect is likely to occur due to the damage of the exhaust pipe during the manufacture of the vacuum insulation glass panel assembly and further that it is difficult to handle the vacuum insulation glass panel assembly because the exhaust pipe remains in a protruding state.

In order to solve such a problem, there has been developed a technique of manufacturing a vacuum insulation glass panel assembly without using an exhaust pipe. For example, Patent Document 1 discloses a depressurizing heating apparatus for a multi-layer glass. The depressurizing heating apparatus surrounds the periphery of an exhaust port of a glass panel and exhausts an air through the exhaust port to form a vacuum in an internal space of the glass panel. Furthermore, a heat-melting sealant is disposed around the exhaust port in the space inside the depressurizing heating apparatus, and a lid member is mounted above the sealant. The depressurizing heating apparatus forms a vacuum inside the glass panel assembly, heats and melts the heat-melting sealant, and then closes the exhaust port by bringing the lid member into close contact with the glass panel. The lid member is placed on the heat-melting sealant, and a ventilation groove for exhausting an air is formed below the heat-melting sealant. Thus, it is possible to perform the exhaust of an air through the exhaust port in a state in which the lid member is placed on the heat-melting sealant.

Meanwhile, Patent Document 2 discloses an apparatus for sealing an exhaust port of a vacuum insulation multi-layer glass panel in an oven. The apparatus disclosed in Patent Document 2 is characterized by a mechanism for moving a lid member for sealing an exhaust port from the lower side to the upper portion of a glass panel. In the apparatus disclosed in Patent Document 2, a lid member having an edge to which a sealant is applied in an annular shape is mounted and disposed below the exhaust port of the glass panel. After the periphery of the exhaust port is sealed under the glass panel and the exhaust of an air from the glass panel assembly is completed through the exhaust port, the sealant applied to the lid member is heated and melted. The apparatus disclosed in Patent Document 2 is configured to move the lid member upward to seal the exhaust port formed in the lower portion of the glass panel. When a push rod for moving the lid member is pressed in a horizontal direction, the link connected to the push rod moves the lid member in a vertical direction.

The apparatuses for sealing an exhaust port using a lid member without using an exhaust pipe disclosed in Patent Documents 1 and 2 does not perform sealing in a state in which the glass panel assembly is put in the vacuum oven. Therefore, sealing failure is likely to occur because it is difficult to accurately position the sealing apparatus in the exhaust port of each of the glass panel assemblies having various sizes. Furthermore, the productivity is low because it is difficult to realize automation. In particular, the invention disclosed in Patent Document 1 has a problem in that sealing failure due to thermal deformation occurs because only the lid member is locally heated and brought into contact with the periphery of the exhaust port of the glass panel assembly having a low temperature.

Furthermore, Patent Document 3 discloses a method of manufacturing a vacuum insulation glass panel assembly using a glass panel in which a sealing material receiving groove is formed around an exhaust port of the glass panel so that a lid member does not protrude. In the method disclosed in Patent Document 3, in order to seal the edge of the glass panel assembly, first, the sealant present at the edge is heated and melted, the air is exhausted through an exhaust port in a vacuum oven, the sealing material is heated and melted, and then the lid member is supplied and brought into contact with the glass panel, thereby sealing the edge of the glass panel assembly. At this time, the melting temperature of the sealant for sealing the edge is lower than the melting temperature of the sealing material for sealing the exhaust port. However, Patent Document 3 does not specifically suggest or disclose a method or apparatus for supplying a lid member to above an exhaust port of a glass panel assembly disposed inside a vacuum oven. Therefore, the invention disclosed in Patent Document 3 cannot be specifically embodied.

Patent Document 4 discloses a method in which a glass panel assembly is put in a vacuum oven and an exhaust port is closed with a closing-off cap made of glass or metal. In the method disclosed in Patent Document 4, an inorganic glass solder is applied around an exhaust port of a glass panel assembly, a closing-off cap is put into a vacuum oven while being held at a predetermined position on the glass solder by a metal spring or the like, and an air present in a space between glass panels exhausted through an opening. When the exhaust is completed and the glass solder existing around the exhaust port reaches a softening temperature, the lid member is pressed with a predetermined tool to seal the exhaust port. The vacuum insulation glass panel assembly manufacturing method disclosed in Patent Document 4 has the following problems. First, when the size of the vacuum insulation glass panel is diverse, the position of the exhaust port formed in the glass panel is changed. This makes it difficult to change the position of a mechanism for pressing the lid member provided inside the vacuum oven. Second, the support member such as a spring or the like used for keeping the lid member above the exhaust port of the glass panel remains inside the glass panel assembly after sealing. This may cause noise or damage to the glass panel assembly during movement or storage of the glass panel assembly. Third, in the process of manufacturing the glass panel assembly, the lid member is dropped or the position of the lid member is changed during the movement thereof. Thus the lid member fails to accurately seal the exhaust port of the glass panel and sealing failure may occur. Fourth, it is difficult to automate the manufacturing process due to the complexity in the installation of the support member for supporting the lid member and the lid member.

PRIOR ART DOCUMENT

Patent Document

Patent Document 1: Japanese Patent Laid-open Publication No. 2003-192401, entitled "Depressurizing heating apparatus for double layer glass"

Patent Document 2: International Publication No. WO 2014/183515 A1, entitled "Sealing device for vacuum glass extraction opening"

Patent Document 3: Korean Patent Registration No. 10-1322585, entitled "Vacuum glass and method for manufacturing the same"

Patent Document 4: Korean Patent Laid-Open Publication No. 10-2013-0076783, entitled "Method of manufacturing vacuum insulation glass panel and glass panel thus manufactured"

Patent Document 5: Korean Patent Application No. 10-2016-0103691, entitled "Apparatus for closing sealing cap of vacuum insulation glass panel"

In recent years, the vacuum insulation glass panel assemblies having excellent heat insulation performance are increasingly used in the windows of buildings in order to save energy. In particular, the vacuum insulation glass panel assembly used for a window of a building requires vacuum insulation double-layer glass panel assemblies having various sizes depending on the design of the building. In addition, in order to expand the spread of vacuum insulation glass panel assemblies, an inexpensive price is required so that the investment cost can be recovered shortly by energy saving. Therefore, there has been a demand for the development of a technique of manufacturing a vacuum insulation double-layer glass which can be mass-produced at a low manufacturing cost.

However, the techniques disclosed in the above-mentioned Patent Documents are difficult to manufacture vacuum insulation glass panel assemblies having various sizes. In the apparatuses for manufacturing a glass panel assembly disclosed in the Patent Documents, the position of a lid member for sealing an exhaust port of a glass panel assembly is determined in a chamber. Therefore, it is difficult to arrange the position of an exhaust port of a glass panel so as to coincide with the arrangement position of the lid member predetermined in the chamber in order to seal the exhaust port of each of the glass panel assemblies having various sizes.

Furthermore, in the case of using the techniques disclosed in the above Patent Documents, it is difficult to mass-produce vacuum insulation glass panel assemblies of various sizes by continuously feeding the vacuum insulation glass panel assemblies. This is because, in the process of manufacturing the glass panel assembly, the step of exhausting an air present inside the glass panel assembly and the step of sealing the exhaust port are not separated from each other so that they can be performed in different chambers. Instead, the exhaust port is sealed after exhausting an air from one chamber through an exhaust port.

Meanwhile, Patent Document 5 discloses a closing apparatus for sealing a lid member for sealing an exhaust port of a vacuum insulation glass panel assembly to the exhaust port. Patent Document 5 is a Korean patent application filed in the Republic of Korea by the present inventor prior to the filing of the subject patent application. The invention disclosed in Patent Document 5 is incorporated herein as a part of the present invention. The closing apparatus disclosed in Patent Document 5 filed in the Republic of Korea by the present inventor prior to the filing of the subject patent application is used in order to achieve the objects of the present invention. However, the present invention is not limited thereto.

SUMMARY

It is an object of the present invention to provide a method and apparatus capable of manufacturing vacuum insulation glass panel assemblies of various sizes. Furthermore, it is an object of the present invention to provide a method and apparatus capable of continuously manufacturing vacuum insulation glass panel assemblies of various sizes. In addition, it is an object of the present invention to provide a novel vacuum insulation glass panel assembly manufacturing method and apparatus capable of performing an air exhaust step and an exhaust port sealing step for a vacuum insulation glass panel assembly in different chambers.

According to one aspect of the present invention, there is provided a vacuum insulation glass panel assembly manufacturing method. The vacuum insulation glass panel assembly manufacturing method according to the present invention includes: an edge sealing step of sealing an edge of a glass panel assembly of glass panels spaced apart at a predetermined interval; and an exhaust port sealing step of causing a lid member to seal an exhaust port of the glass panel assembly formed so as to communicate with a space between the glass panels whose edges are sealed.

In the edge sealing step, a glass panel assembly obtained by applying a first sealing agent having a high melting point (high temperature melting first frit) to edges of the glass panels spaced apart at a predetermined interval is put into a first heating chamber and is heated to melt the first sealing agent to seal the edge of the glass panel assembly.

The exhaust port sealing step includes: a lid member mounting step of mounting a lid member on the glass panel assembly so that one surface of the lid member coated with a second sealing agent having a low melting point (low temperature melting second frit) faces the exhaust port of the glass panel assembly at a predetermined interval; a second sealing agent melting step of putting the glass panel assembly mounted with the lid member into a second heating chamber and melting the second sealing agent by heating the glass panel assembly to a temperature at which the first sealing agent having a high melting point is not melted and the second sealing agent having a low melting point is melted; a vacuum forming step of putting the glass panel assembly having the molten second sealing agent into a first vacuum heating chamber, heating the glass panel assembly to a temperature at which only the second sealing agent is kept in a molten state, and depressurizing the first vacuum heating chamber so that an air is exhausted through the exhaust port of the glass panel assembly to form a vacuum in the space between the glass panels; a lid member close contact step of, when moving the glass panel assembly to a second vacuum heating chamber communicating with the first vacuum heating chamber and remaining in a depressurized state, bringing the lid member into close contact with a periphery of the exhaust port to seal the glass panel assembly; and a pressurizing step of, after putting the vacuum insulation glass panel assembly sealed by the lid member into the second vacuum heating chamber kept in a depressurized state, pressurizing the second vacuum heating chamber to an atmospheric pressure.

In some embodiments, the exhaust port sealing step may include: a step of mounting a lid member closing device mounted with a lid member having one surface coated with a second sealing agent having a low melting point on the glass panel assembly having a sealed edge so that the lid member is disposed around the exhaust port of the glass panel assembly so as to be spaced apart by a predetermined distance; a step of putting the edge-sealed glass panel assembly mounted with the lid member closing device into a second heating chamber and melting the second sealing agent coated on the lid member by heating the glass panel assembly to a temperature at which the first sealing agent having a high melting point is not melted and the second sealing agent having a low melting point is melted; a step of putting the glass panel assembly mounted with the lid member closing device into a first vacuum heating chamber kept in an atmospheric pressure state, heating the glass panel assembly to maintain the second sealing agent in a molten state, and depressurizing the first vacuum heating chamber so that an air is exhausted through the exhaust port of the glass panel assembly to form a vacuum in the space between the glass panels; a lid member close contact step of, when moving the glass panel assembly to a second vacuum heating chamber communicating with the first vacuum heating chamber and remaining in a depressurized state, bringing the lid member mounted on the lid member closing device into close contact with a periphery of the exhaust port of the glass panel assembly by an external force acting on the lid member closing device to seal the exhaust port of the glass panel assembly; and a pressurizing step of, after putting the vacuum insulation glass panel assembly sealed by the lid member into the second vacuum heating chamber kept in a depressurized state, pressurizing the second vacuum heating chamber to an atmospheric pressure.

In some embodiments, the lid member closing device may include a clamping unit having a guide hole and configured to be fixed to the glass panel assembly, a lid member holder installed in the guide hole so as to move along the guide hole, a lever rotatably mounted on the clamping unit, and an elevating means configured to raise and lower the lid member holder in response to rotational movement of the lever. A lever pressing member is arranged in a passage connecting the first vacuum heating chamber and the second vacuum heating chamber or in the second vacuum heating chamber so that the lever pressing member applies an external force to the lever of the lid member closing device when the glass panel assembly is moved in the lid member close contact step.

According to another aspect of the present invention, there is provided a vacuum insulation glass panel assembly manufacturing apparatus. The vacuum insulation glass panel assembly manufactured by the vacuum insulation glass panel assembly manufacturing apparatus is a vacuum insulation glass panel assembly in which an edge between glass panels spaced apart at a predetermined interval is sealed by a first sealing agent having a high melting point, and an exhaust port formed so as to communicate with a space between the glass panels having a sealed edge is sealed by bringing a lid member coated with a second sealing agent having a low melting point into contact with a periphery of the exhaust port. The apparatus according to the present invention includes: a first heating chamber configured to heat the glass panel assembly to a temperature at which the first sealing agent having a high melting point is melted; a second heating chamber configured to heat the glass panel assembly to a temperature at which the first sealing agent having a high melting point is not melted and the second sealing agent having a low melting point is melted; a first vacuum heating chamber configured to form a depressurized state below an atmospheric pressure; a second vacuum heating chamber connected to the first vacuum heating chamber by a passage and configured to form a depressurized state below an atmospheric pressure; a lid member closing device including a clamping unit having a guide hole and configured to be fixed to the glass panel assembly, a lid member holder installed in the guide hole so as to move along the guide hole, a lever rotatably mounted on the clamping unit, and an elevating means configured to raise and lower the lid member holder in response to rotational movement of the lever; and a lever pressing member arranged in a passage connecting the first vacuum heating chamber and the second vacuum heating chamber or in the second vacuum heating chamber so that the lever pressing member applies an external force to the lever of the lid member closing device when the glass panel assembly mounted with the lid member closing device is moved from the first vacuum heating chamber to the second vacuum heating chamber.

According to the vacuum insulation glass panel assembly manufacturing method of the present invention, it is possible to manufacture vacuum insulation glass panel assemblies of various sizes in one manufacturing facility. Furthermore, according to the manufacturing method of the present invention, it is possible to continuously manufacture vacuum plate glass assemblies by sealing the exhaust port in the vacuum oven using the lid member closing device mounted with the lid member. In addition, according to the manufacturing method of the present invention, the air exhaust step and the exhaust port sealing step for the vacuum insulation glass panel assembly are performed in different chambers. Therefore, the glass panel assemblies can be mass-produced at a low cost while continuously feeding the glass panel assemblies through the conveyor.

DETAILED DESCRIPTION

Preferred embodiments of the present invention will now be described in detail with reference to the accompanying drawings.

Figure 1:
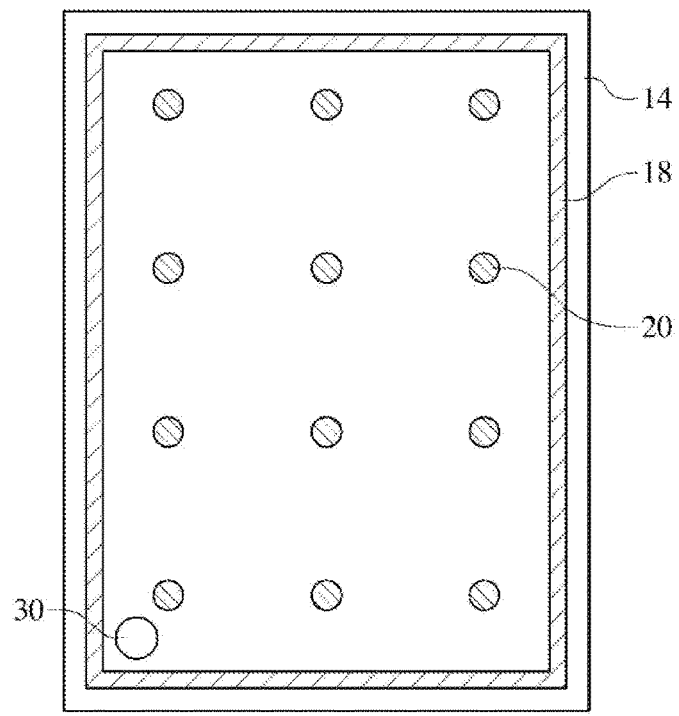
FIG. 1 is a plan view of a vacuum insulation glass panel assembly manufactured in accordance with the present invention.
Figure 2:
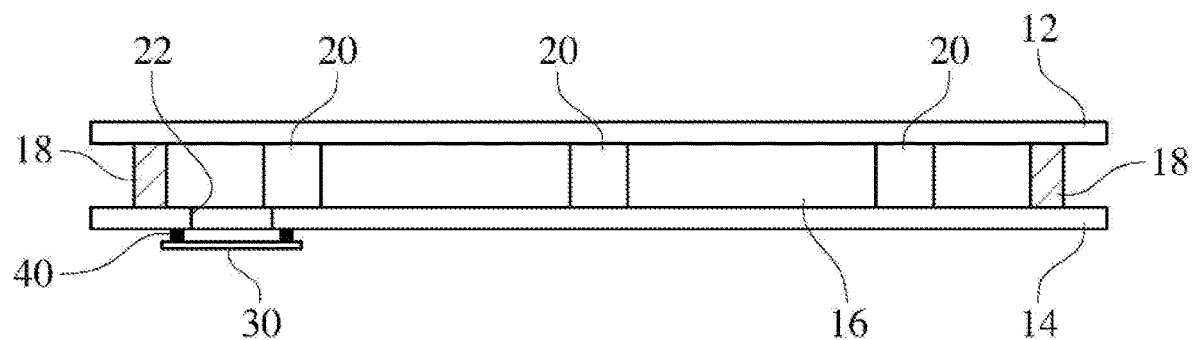
FIG. 2 is a cross-sectional view showing the sealed exhaust port of the vacuum insulation glass panel assembly shown in FIG. 1.

Referring to FIGS. 1 and 2, a vacuum insulation glass panel assembly 10 manufactured using the method and apparatus of the present invention will be described. The vacuum insulation glass panel assembly 10 includes an upper glass panel 12, a lower glass panel 14 and a solder glass 18 applied to an edge between the upper glass panel 12 and the lower glass panel 14 facing each other and configured to define a depressurized vacuum space. A solder glass having a high melting point is used as the solder glass (frit) for sealing the edge of the glass panel assembly. It is preferable that a solder glass melted at a temperature in the range of 380 to 460 degrees C. is used as the solder glass 18 having a high melting point. The upper glass panel 12 and the lower glass panel 14 are spaced apart from each other by a predetermined distance to define a vacuum space 16 surrounded by the solder glass 18. Furthermore, a plurality of spacers 20 is disposed to maintain a gap between the upper glass panel 12 and the lower glass panel 14 and to protect the glass panels against damage. The spacers 20 are formed in a cylindrical or spherical shape and made of small-sized glass or stainless steel. Although not shown, a getter for adsorbing moisture or gas remaining in the vacuum space is inserted into the glass panel assembly 10.

An exhaust port 22 is formed at the edge of the lower glass panel 14. The exhaust port 22 communicates with the space 16 where vacuum is formed by the solder glass 18 having a high melting point. Although one exhaust port 22 is shown in this embodiment, a plurality of exhaust ports may be formed according to the size of the glass panel assembly 10. The exhaust port 22 is sealed by a lid member 30. The lid member 30 is brought into close contact with the lower glass panel 14 by the molten solder glass 40 applied around the exhaust port 22. The lid member 30 may be made of a glass or a metal plate. In the case of using a metal plate, it may be possible to use a metal plate having the same or similar thermal expansion coefficient as that of a glass. A solder glass having a low melting point is used as the solder glass 40. It is preferable that the solder glass 40 having a low melting point is a solder glass melted at a temperature in the range of 230 to 280 degrees.

In the description of the present invention, the term "glass panel assembly" refers to a glass panel assembly available before the exhaust port is sealed by the lid member, and the term "vacuum insulation glass panel assembly" refers to an assembly in which the exhaust port is sealed by the lid member.

Figure 3:
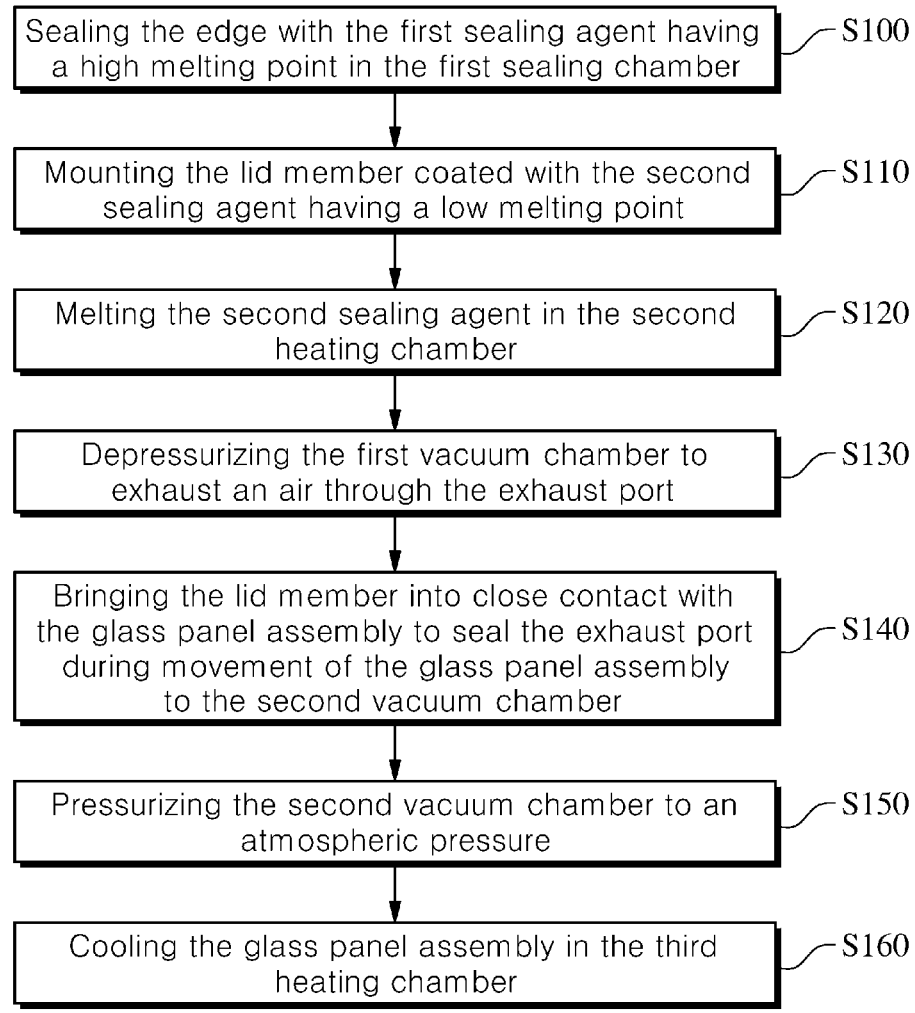
FIG. 3 is a flowchart of a vacuum insulation glass panel assembly manufacturing method according to the present invention.

Referring to FIG. 3, a method of manufacturing a vacuum insulation glass panel assembly 10 according to the present invention will be described. First, the edge sealing of the glass panel assembly is performed in a first heating chamber (S100). The edge sealing is performed by putting a glass panel assembly, which is obtained by applying a first sealing agent having a high melting point to an edge between a pair of glass panels spaced apart from each other by a predetermined distance, into the first heating chamber. The first heating chamber is heated so that the temperature inside the chamber gradually increases from an inlet to maintain a predetermined temperature T2 (a temperature in the range of 380 to 460 degrees C.). The temperature inside the chamber is set such that the temperature of the glass panel assembly at the time of discharging the glass panel assembly through an outlet of the first heating chamber is 80 degrees C. or lower. When the glass panel assembly passes through the first heating chamber, the solder glass 18 having a high melting point is melted, and the upper glass panel 12 and the lower glass panel 14 are brought into close contact with each other to seal the edge.

Next, exhaust port sealing is performed to seal the exhaust port of the glass panel assembly, which is formed so as to communicate with the space between the pair of edge-sealed glass panels, with the lid member. Before sealing the exhaust port, the lid member is mounted on the glass panel assembly so that one surface of the lid member coated with a second sealing agent having a low melting point prepared in advance faces the exhaust port of the glass panel assembly at a predetermined distance (S110). The mounting of the lid member is performed using a lid member closing device. The lid member closing device can be manufactured in various forms as will be described later.

Next, the glass panel assembly mounted with the lid member is put into a second heating chamber, and the second sealing agent is melted by heating the glass panel assembly to a temperature at which the first sealing agent having a high melting point is not melted but the second sealing agent having a low melting point is melted (S120). The temperature of the second heating chamber is set so that the temperature at an inlet gradually increases from a temperature of about 80 degrees C. or lower and is maintained at a temperature T1 (a temperature in the range of 230 to 280 degrees C.) from a predetermined section to an outlet. When the glass panel assembly 10 is put into the second heating chamber at the set temperature, the first solder glass 18 having a high melting point, which seals the edge of the glass panel assembly 10, is not melted, and only the second solder glass 40 having a low melting point, which is mounted on the lid member closing device, is melted.

Next, the glass panel assembly having the melted second sealing agent is put into a first vacuum heating chamber kept at an atmospheric pressure and is heated to a temperature at which only the second sealing agent is maintained in a melted state. At the same time, the first vacuum heating chamber is depressurized so that an air is exhausted through the exhaust port of the glass panel assembly to form a vacuum in a space between the pair of glass panels (S130). The first vacuum heating chamber is depressurized from an atmospheric pressure to a pressure of about $10^{-4}$ Torr so that an air present in a space between the pair of glass plates is exhausted.

Next, when the glass panel assembly is moved to a second vacuum heating chamber which communicates with the first vacuum heating chamber and maintains a depressurized state, the lid member is brought into close contact with the exhaust port to seal the glass panel assembly (S140). A lid member closing device to be described later is used to bring the lid member into close contact with the exhaust port during the movement of the glass panel assembly. The temperature of the first vacuum heating chamber is maintained at a temperature at which the solder glass 40 having a low melting point is melted. Therefore, when the lid member is brought into close contact with the exhaust port, the solder glass 40 having a low melting point is compressed so that the lid member and the lower glass panel 14 are bonded to each other to seal the exhaust port 22.

According to the present invention, the air exhaust step of the glass panel assembly and the sealing step of the lid member are separated from each other so that they can be performed in different vacuum heating chambers (vacuum ovens). Therefore, the manufacturing process can be automated in a continuous fashion. Furthermore, since the lid member and the glass panel assembly are brought into close contact with each other in a heated state in the vacuum oven, it is possible to prevent occurrence of defects due to thermal deformation.

Next, the vacuum insulation glass panel assembly sealed by bringing the lid member into contact therewith is put into the second vacuum heating chamber kept in a depressurized state, and then the pressure inside the second vacuum heating chamber is raised to an atmospheric pressure (S150). The second vacuum heating chamber is set to heat the vacuum insulation glass panel assembly so that the solder glass 40 having a low melting point is maintained in a molten state. The vacuum insulation glass panel assembly sealed with the lid member is put into a third heating chamber where the glass panel assembly is gradually cooled to an ambient temperature (S160).

Figure 4:
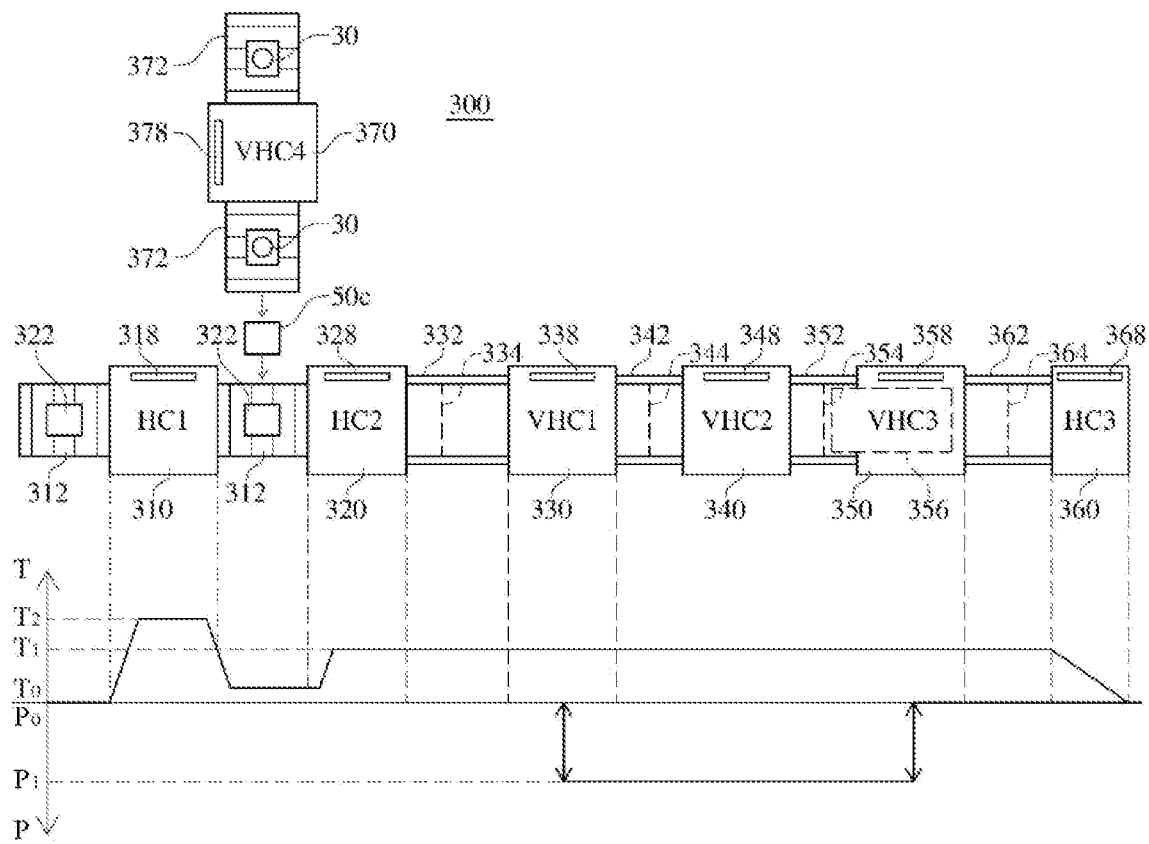
FIG. 4 is a schematic view of a vacuum insulation glass panel assembly manufacturing apparatus according to an embodiment of the present invention.

Hereinafter, the vacuum insulation glass panel assembly manufacturing apparatus and method according to the present invention will be described in more detail with reference to FIGS. 4 to 10. Referring to FIG. 4, the vacuum insulation glass panel assembly manufacturing apparatus 300 according to the present invention includes a first heating chamber 310 for sealing an edge of a glass panel assembly and a second heating chamber 320 for melting a solder glass 40 applied to an edge of one surface of a lid member. The vacuum insulation glass panel assembly manufacturing apparatus 300 further includes a third heating chamber 360 for slowly cooling the sealed vacuum insulation glass panel assembly 10. A fourth heating chamber 370 is a chamber for preheating the solder glass 40 applied to the edge of the lid member 30 to discharge a noxious gas contained in the solder glass and baking the solder glass 40. It is preferable that the first to fourth heating chambers are configured to perform heating by a hot air. The heating chambers 310, 320, 360 and 370 are provided with hot air heaters 318, 328, 368 and 378, respectively.

The vacuum insulation glass panel assembly manufacturing apparatus 300 further includes three vacuum heating chambers 330, 340 and 350 for evacuating and sealing an internal space of the glass panel assembly 10. A conveyor 312 is installed to convey the glass panel assembly 10 to the first to third heating chambers and the three vacuum chambers 330, 340 and 350. The glass panel assembly 10 is conveyed on the conveyor 312 in a state in which the glass panel assembly 10 is mounted on a special pallet 322. Furthermore, a conveyor 372 is also provided in the fourth heating chamber 370. The solder glass 40 is baked while moving the lid member 30 in a state in which the lid member 30 having the solder glass 40 coated on the edge thereof is mounted on to the pallet 322.

First, prior to being put into the first heating chamber 310 for edge sealing, the glass panel assembly 10 is mounted on the pallet 322 in a state in which the glass solder 18 having a high melting point is applied to the edges of the upper glass panel 12 and the lower glass panel 14. The first heating chamber 310 is heated so that the temperature inside the chamber gradually increases from an inlet to maintain a predetermined temperature T2 (a temperature in the range of 380 to 460 degrees C.). The temperature inside the first heating chamber 310 is set such that the temperature of the glass panel assembly at the time of discharging the glass panel assembly through an outlet of the first heating chamber 310 is 80 degrees C. or lower. When the glass panel assembly mounted on the pallet 322 passes through the first heating chamber 310, the solder glass 18 having a high melting point is melted, and the upper glass panel 12 and the lower glass panel 14 are brought into close contact with each other to seal the edge.

In a preliminary preparation work, the lid member 30 having an edge of one surface coated with the solder glass 40 having a low melting point baked in the fourth heating chamber 370 is mounted on a lid member closing device 50C. The clamping unit of the lid member closing device 50C is fixed to the glass panel assembly 10 subjected to edge sealing while passing through the first heating chamber 310. The lid member 30 is positioned below the exhaust port 22 of the glass panel assembly 10 when the lid member closing device 50C is fixed to the glass panel assembly 10.

Figure 6:
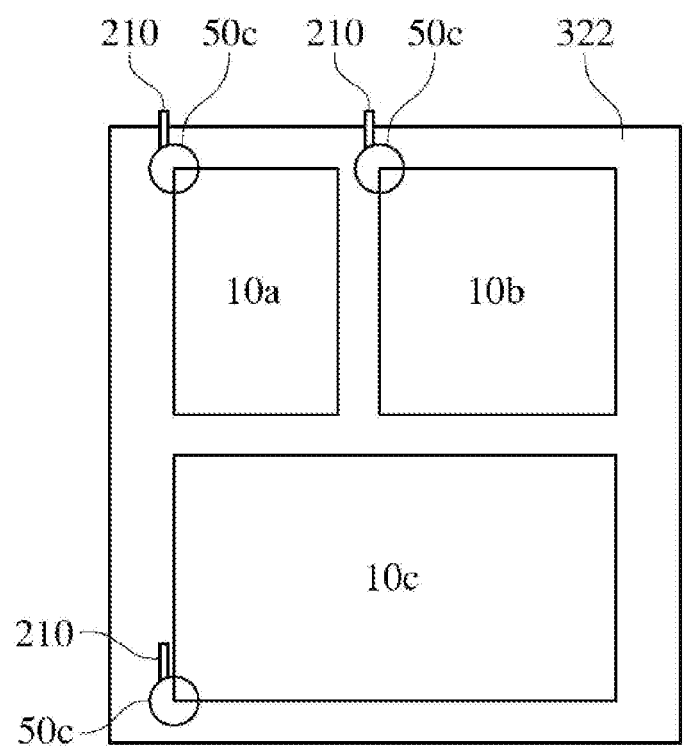
FIG. 6 is an explanatory view showing a state in which vacuum insulation glass panels are placed on a pallet used in the manufacturing apparatus according to the present invention.

FIG. 6 schematically shows a state in which the cover member closing device 50C is fixed to a plurality of glass panel assemblies 10a, 10b and 10c of different sizes mounted on the pallet 322. The lever 210 of the lid member closing device 50C is vertically erected in a fixed state. The lid member closing device 50C will be described later.

Figure 5:
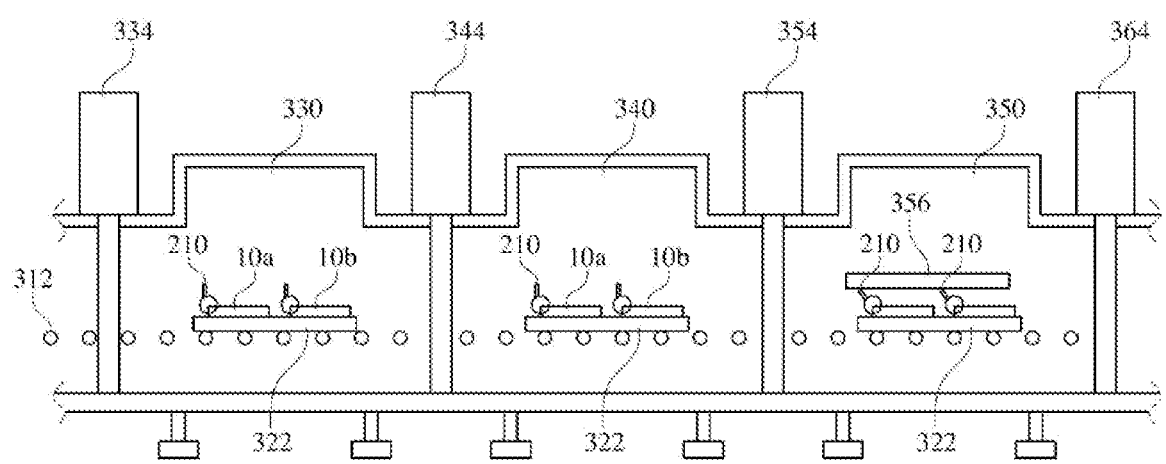
FIG. 5 is a cross-sectional view of the vacuum heating chambers of the manufacturing apparatus shown in FIG. 4.

Referring to FIGS. 4 and 5, the glass panel assemblies 10a, 10b and 10c to which the lid member closing device 50C is fixed are mounted on the pallet 322 and put into the second heating chamber 320. As shown in FIG. 3, the temperature of the second heating chamber 320 is set so that the temperature at an inlet gradually increases from a temperature of about 80 degrees C. or lower and is maintained at a temperature T1 (a temperature in the range of 230 to 280 degrees C.) from a predetermined section to an outlet. When the glass panel assembly 10 is put into the second heating chamber 320 at the set temperature, the first solder glass 18 having a high melting point, which seals the edge of the glass panel assembly 10, is not melted, and only the second solder glass 40 having a low melting point, which is mounted on the lid member closing device 50c, is melted.

The second heating chamber 320 and the depressurizing heating chamber 330 are connected to each other by a passage 332, and a gate valve 334 is installed in the passage 332. Furthermore, the depressurizing heating chamber 330 and the depressurizing maintaining chamber 340 are connected to each other by a passage 342, and a gate valve 344 is installed in the passage 342. Moreover, the depressurizing maintaining chamber 340 and the pressurizing heating chamber 350 are connected to each other by a passage 352, and a gate valve 354 is installed in the passage 352. The pressurizing heating chamber 350 and the third heating chamber 360 are connected to each other by a passage 362, and a gate valve 364 is installed in the passage 362. The vacuum chambers 330, 340 and 350 are provided with heaters 338, 348 and 358, respectively. Each of the heaters 338, 348 and 358 may be a heater that uses the radiant heat of a heat transfer cartridge heater or a lamp depending on the degree of vacuum.

The glass panel assembly 10 discharged from the second heating chamber 320 passes through the passage 332 and is put into the depressurizing heating chamber 330. The depressurizing heating chamber 330 maintains an atmospheric pressure state P0 when the glass panel assembly 10 is put into the depressurizing heating chamber 330. When the gate valve 334 is opened in the atmospheric pressure state, the pallet 322 is conveyed by the conveyor 312 into the depressurizing heating chamber 330. Then the gate valve 334 is closed and the inside of the chamber 330 is depressurized to a pressure of about $10^{-4}$ Torr. The gas existing in the space 16 of the glass panel assembly 10 is exhausted through the exhaust port 22 by the depressurization. The heater 338 installed inside the depressurizing heating chamber 330 maintains the temperature T1 when the solder glass 40 having a low melting point, the lid member 30 and the glass panel assembly 10 are heated and put into the depressurizing heating chamber 330.

The depressurizing maintaining chamber 340 is maintained at a reduced pressure of about $10^{-4}$ Torr. The gate valve 344 is opened with the gate valves 334 and 354 kept in a closed state, and the plate glass assembly 10 existing inside the depressurizing heating chamber 330 is conveyed to the depressurizing maintaining chamber 340. In the depressurizing maintaining chamber 340, the gas existing in the space 16 of the glass panel assembly 10 is completely exhausted through the exhaust port 22. A heater is also installed inside the depressurizing maintaining chamber 340 to heat the lid member 30 and the solder glass 40 so that the solder glass 40 having a low melting point is maintained in a molten state.

When the exhaust is completed in the depressurizing maintaining chamber 340, the gate valve 354 is opened while keeping the gate valve 344 and the gate valve 364 in a closed state, and the glass panel assembly 10 is conveyed to the pressurizing heating chamber 350. The pressurizing heating chamber 350 is maintained at a reduced pressure of about $10^{-4}$ Torr while the glass panel assembly 10 is being conveyed.

During the conveyance of the glass panel assembly 10 to the pressurizing heating chamber 350, the lid member 30 is brought into close contact with the lower glass panel 14 of the glass panel assembly 10 to seal the glass panel assembly 10 under vacuum. That is, when the glass panel assembly 10 is conveyed in a state in which the lever 210 of the lid member closing device 50C is vertically erected, the lever 210 of the lid member closing device 50C is rotated by a lever pressing member 356 installed inside the passage 352 and/or the pressurizing heating chamber 350. As will be described below in detail, when the lever 210 is rotated, the lid member 40 is moved up toward and brought into contact with the lower glass panel 14 in conjunction with the rotation of the lever 210, and the solder glass 40 having a low melting point closes the periphery of the exhaust port of the lower glass panel 14 to seal the exhaust port 22. When the sealing by the lid member 30 is completed, the pressure inside the pressurizing heating chamber 350 is increased to the atmospheric pressure P0.

When the pressure inside the pressurizing heating chamber 350 has been increased, the gate valve 364 of the passage 362 is opened and the vacuum insulation glass panel assembly 10 is conveyed to the third heating chamber 360 for cooling. The third heating chamber 360 is configured such that the temperature is gradually lowered with the inlet temperature maintained at the temperature T1 so that the outlet temperature becomes a temperature close to the ambient temperature. The vacuum insulation glass panel assembly 10 is cooled to the ambient temperature in the third heating chamber 360 and is discharged.

The lid member closing device 50C will be described in detail with reference to FIGS. 7 to 10. The lid member closing device 50C used in the manufacturing apparatus 300 of the present invention includes a clamping unit 60, a lid member holder 80, a lever 210 rotatably coupled to the clamping unit 60, and an elevating means configured to raise and lower the lid member holder 80 in response to the rotational movement of the lever 210.

The clamping unit 60 includes a top plate 62, a bottom plate 64, a joint plate 66 and a clamping screw 68. The top plate 62 is horizontally disposed above the upper glass panel 12 at an interval from the upper surface of the upper glass panel 12. The bottom plate 64 is horizontally disposed below the lower glass panel 14 so as to be parallel to the top plate 62. The upper surface of the bottom plate 64 may be brought into contact with the lower surface of the lower glass panel 14. A guide hole 64a is formed at the center of the bottom plate 64 so as to be aligned with the exhaust port 22. An exhaust passage 64b is formed on the upper surface of the bottom plate 64 so as to be connected to the guide hole 64a. The exhaust passage 64b is formed in a channel shape so that an air can be exhausted smoothly through the exhaust port 22.

The joint plate 66 connects one edge of the top plate 62 and one edge of the bottom plate 64. A shaft hole 66a is formed in the lower end portion of the joint plate 66 extending below the bottom plate 64. The clamping screw 68 is fastened to the top plate 62 so as to clamp the upper glass panel 12. A foot 70 is coupled to the lower end of the clamping screw 68 so as to support the upper surface of the upper glass panel 12. The bottom plate 64 and the foot 70 may be made of a material having a low electrical conductivity and thermal conductivity, for example, bismuth, so as to protect the glass panel assembly 10 from heat. A shaft bracket 72 is coupled to the lower surface of the bottom plate 64 so as to face the joint plate 66 in a spaced-apart relationship with each other. A shaft hole 72a is formed in the lower end portion of the shaft bracket 72 so as to be aligned with the shaft hole 66a of the joint plate 66. In some embodiments, a pair of shaft brackets may be coupled to the lower surface of the bottom plate 64 so as to face each other at an interval.

A holder 80 for holding the lid member 30 for closing the exhaust port 22 is fitted into the guide hole 64a so as to be able to move up and down along the guide hole 64a. A recess 82 for seating the lid member 30 is formed on the upper surface of the holder 80. A bore 84 is formed on the lower side of the holder 80.

Figure 7:
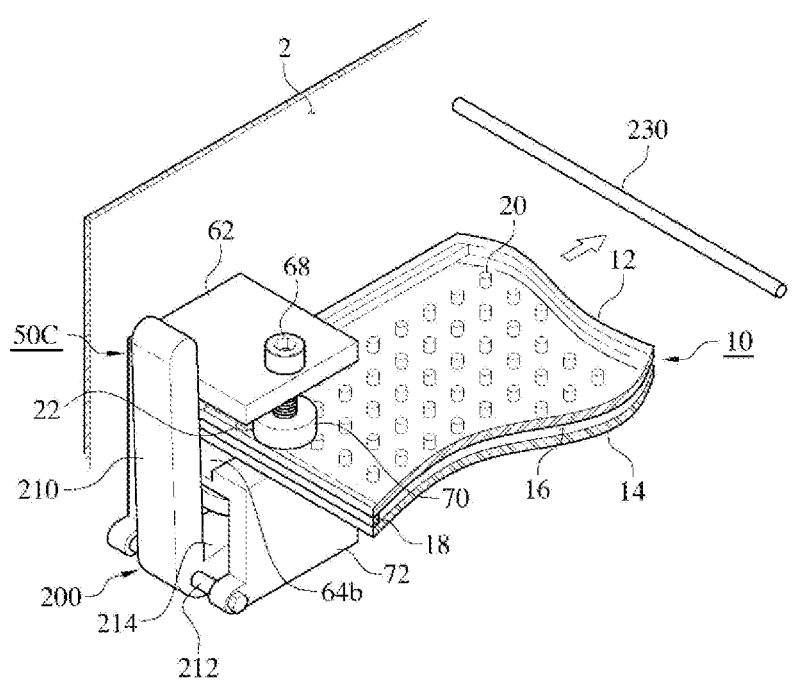
FIG. 7 is a perspective view of one example of a lid member closing device used in the manufacturing apparatus according to the present invention.
Figure 8:
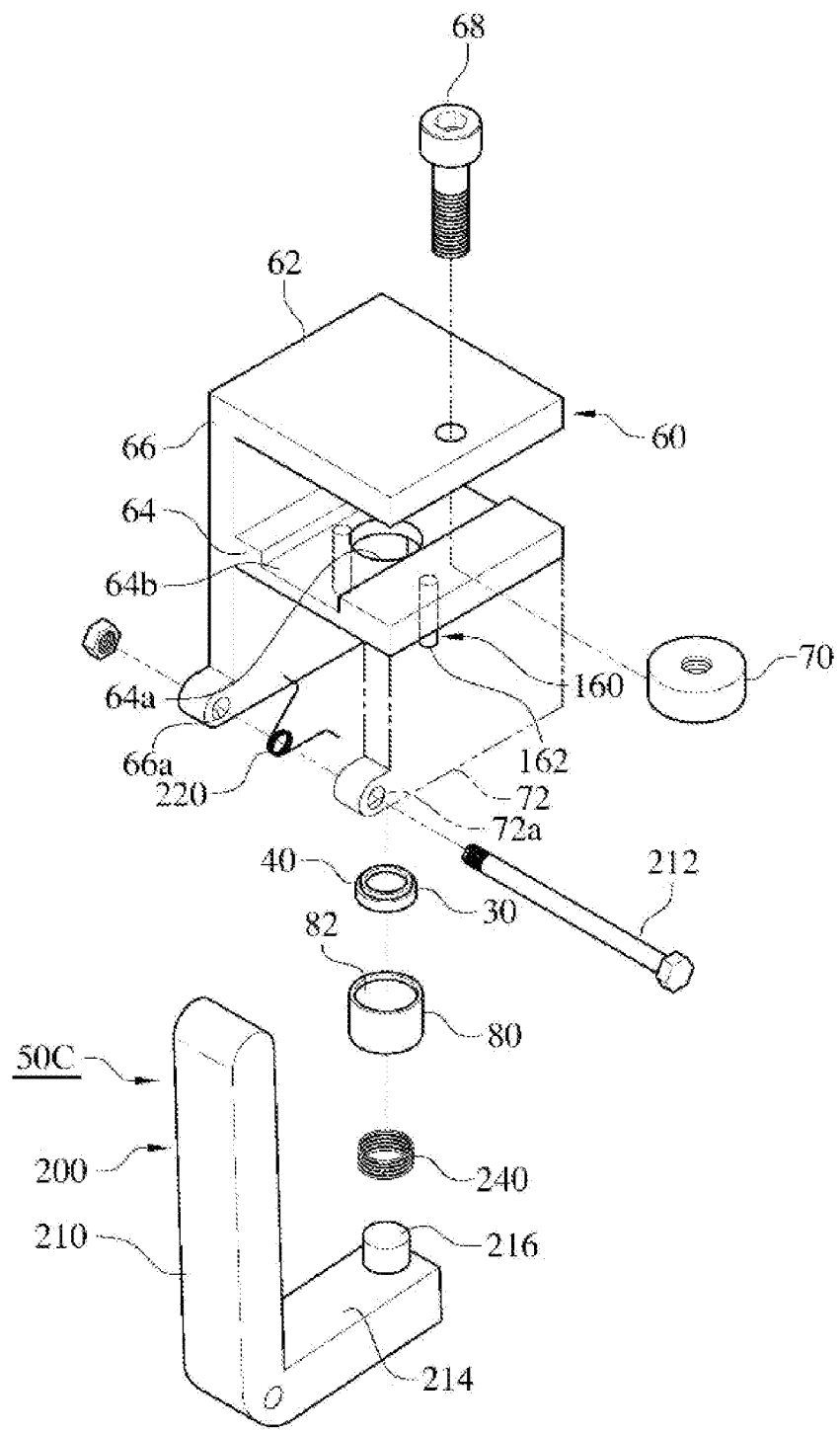
FIG. 8 is an exploded perspective view of the lid member closing device shown in FIG. 7.

The sealing cap closing device 50C includes an elevating means for raising the holder 80 to bring the lid member 30 attached to the holder 80 into close contact with the periphery of the exhaust port 22. The elevating means may be implemented in various forms. Th elevating means may be any mechanism capable of converting the rotational movement of the lever 210 into the linear up-and-down movement of the holder 80. For example, as shown in FIGS. 7 and 8, an arm 214 extending from one end of the lever 210 is formed, and the lever 210 is installed so as to be rotatable about a shaft 212, so that the arm 214 presses the holder 80 when the lever 210 rotates. A boss 216 is formed on the upper surface of the end portion of the arm 214. The boss 216 is inserted into the bore 84 of the holder 80. A coil spring 240 is further mounted between the holder 80 and the pressing portion 214 so as to buffer the impact applied to the holder 80. The coil spring 240 is received in the bore 84 of the holder 80. The boss 216 is fitted to the coil spring 240.

In some embodiments, the arm 214 of the lever 210 may be hooked into a groove or a hole formed on the side surface of the holder 80 so that the holder 80 can be raised by the rotational movement of the lever 210. In some embodiments, the holder 80 may be configured to be raised and lowered by providing a gear rotated by the rotational movement of the lever and a rack moved up and down in engagement with the gear.

FIG. 7 shows a rod-shaped lever pressing member 230 for applying an external force to rotate the lever 210 when moving the glass panel assembly 10 placed on the pallet 322. If necessary, as shown in FIG. 4, a plate-shaped lever pressing member 356 may be used to maintain the lever 210 in a rotated state for a predetermined period. The return spring 120 applies an elastic restoring force to the lever 210 so that the lever 210 can be returned to the initial position. The return spring 120 may be composed of a torsion spring mounted on the shaft 112 to connect the joint plate 66 and the lever 210. In addition, the return spring 120 may be composed of a coil spring installed between the joint plate 66 and the lever 210.

Figure 9:
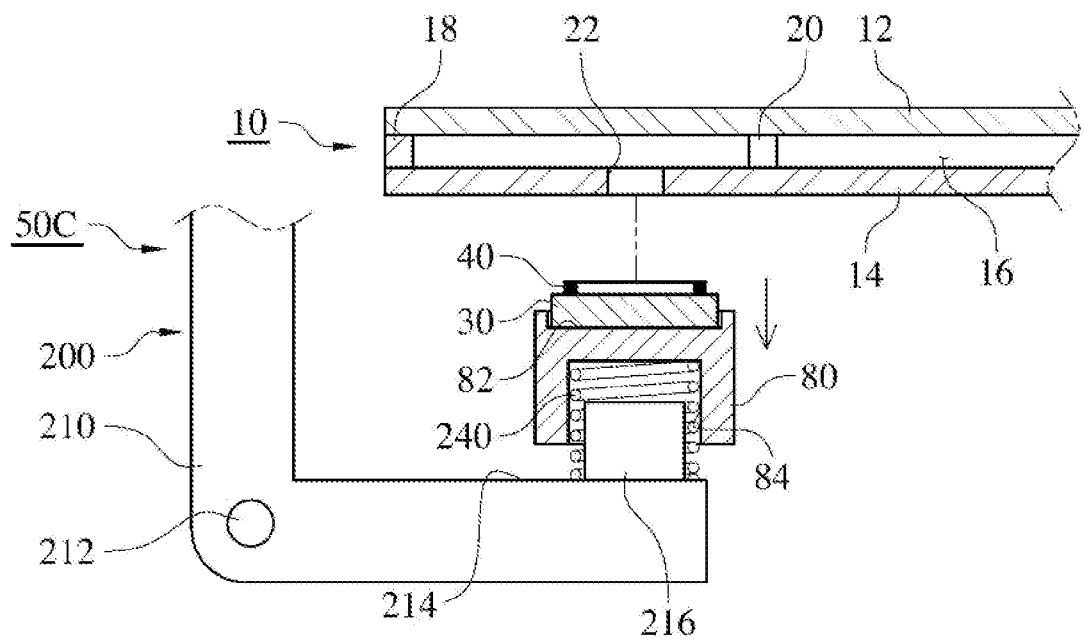
FIG. 9 is a schematic view showing a state available before the lid member closing device shown in FIG. 7 closes the lid member.
Figure 10:
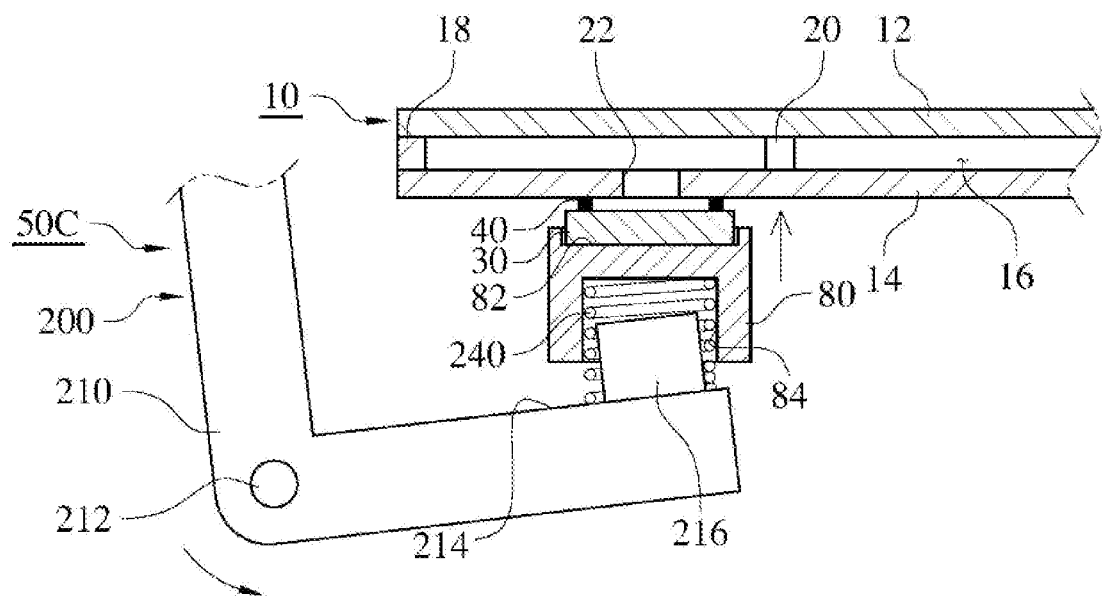
FIG. 10 is a schematic view showing a state in which the lid member closing device shown in FIG. closes the lid member.

Referring to FIGS. 9 and 10, if the lever 210 is rotated by the lever pressing member 356 when the glass panel assembly 10 is conveyed while being discharged from the depressurizing maintaining chamber 340, the arm 214 raises the holder 80 while compressing the coil spring 240. The holder 80 is moved up along the guide hole 64a, and the lid member 30 is pressed against the periphery of the exhaust port 22. As a result, the softened solder glass 40 having a low melting point is bonded to the periphery of the exhaust port 22, and the lid member 30 completely closes the exhaust port 22 to maintain sealing.

It should be understood that the embodiments according to the present invention described above are not intended to limit the present invention but are exemplary. The motor according to the present invention may be modified into various forms. In addition to the embodiments described above, the various elevating means of the lid member closing device may be embodied by those skilled in the art without departing from the spirit or scope of the invention. The present invention may be modified and embodied in various forms within the scope of the claims and equivalents thereof.

What is claimed is:

1. A vacuum insulation glass panel assembly manufacturing method, comprising:
   an edge sealing step of sealing edges of a glass panel assembly of glass panels spaced apart at a predetermined interval; and
   an exhaust port sealing step of causing a lid member to seal an exhaust port of the glass panel assembly formed so as to communicate with a space between the glass panels whose edges are sealed,
   wherein in the edge sealing step, the glass panel assembly obtained by applying a first sealing agent having a higher melting point to the edges of the glass panels spaced apart at the predetermined interval is put into a first heating chamber and is heated to melt the first sealing agent to seal the edges of the glass panel assembly, and
   the exhaust port sealing step includes:
   a lid member mounting step of mounting the lid member on the glass panel assembly so that one surface of the lid member coated with a second sealing agent having a lower melting point than the first sealing agent faces the exhaust port of the glass panel assembly at a predetermined interval;
   a second sealing agent melting step of putting the glass panel assembly mounted with the lid member into a second heating chamber and melting the second sealing agent by heating the glass panel assembly to a temperature at which the first sealing agent having the higher melting point than the second sealing agent is not melted and the second sealing agent having the lower melting point is melted;
   a vacuum forming step of putting the glass panel assembly having the molten second sealing agent into a first vacuum heating chamber, heating the glass panel assembly to a temperature at which only the second sealing agent is kept in a molten state, and depressurizing the first vacuum heating chamber so that an air is exhausted through the exhaust port of the glass panel assembly to form a vacuum in the space between the glass panels;
   a lid member contacting step of, when moving the glass panel assembly to a second vacuum heating chamber communicating with the first vacuum heating chamber and remaining in a depressurized state, bringing the lid member into contact with a periphery of the exhaust port to seal the glass panel assembly; and
   a pressurizing step of, after putting the glass panel assembly sealed by the lid member into the second vacuum heating chamber kept in the depressurized state, pressurizing the second vacuum heating chamber to an atmospheric pressure.

2. A vacuum insulation glass panel assembly manufacturing method, comprising:
   an edge sealing step of sealing edges of a glass panel assembly of glass panels spaced apart at a predetermined interval; and
   an exhaust port sealing step of causing a lid member to seal an exhaust port of the glass panel assembly formed so as to communicate with a space between the glass panels whose edges are sealed,
   wherein in the edge sealing step, a glass panel assembly obtained by applying a first sealing agent having a higher melting point to the edges of the glass panels spaced apart at the predetermined interval is put into a first chamber and is heated to melt the first sealing agent to seal the edges of the glass panel assembly, and
   the exhaust port sealing step includes:
   a step of mounting a lid member closing device mounted with the lid member having one surface coated with a second sealing agent having a lower melting point than the first sealing agent on the glass panel assembly having the sealed edges so that the lid member is disposed around the exhaust port of the glass panel assembly so as to be spaced apart by a predetermined distance;
   a step of putting the edge-sealed glass panel assembly mounted with the lid member closing device into a second heating chamber and melting the second sealing agent coated on the lid member by heating the glass panel assembly to a temperature at which the first sealing agent having the higher melting point than the second sealing agent is not melted and the second sealing agent having the lower melting point is melted;
   a step of putting the glass panel assembly mounted with the lid member closing device into the first vacuum heating chamber kept in an atmospheric pressure state, heating the glass panel assembly to maintain the second sealing agent in a molten state, and depressurizing the first vacuum heating chamber so that an air is exhausted through the exhaust port of the glass panel assembly to form a vacuum in the space between the glass panels;
   a lid member contacting step of, when moving the glass panel assembly to a second vacuum heating chamber communicating with the first vacuum heating chamber and remaining in a depressurized state, bringing the lid member mounted on the lid member closing device into contact with a periphery of the exhaust port of the glass panel assembly by an external force acting on the lid member closing device to seal the exhaust port of the glass panel assembly; and
   a pressurizing step of, after putting the glass panel assembly sealed by the lid member into the second vacuum heating chamber kept in the depressurized state, pressurizing the second vacuum heating chamber to an atmospheric pressure.

3. The method of claim 2, wherein the lid member closing device includes a clamping unit having a guide hole and configured to be fixed to the glass panel assembly, a lid member holder installed in the guide hole so as to move along the guide hole, a lever rotatably mounted on the clamping unit, and an elevating means configured to raise and lower the lid member holder in response to rotational movement of the lever, and a lever pressing member is arranged in a passage connecting the first vacuum heating chamber and the second vacuum heating chamber or in the second vacuum heating chamber so that the lever pressing member applies an external force to the lever of the lid member closing device when the glass panel assembly is moved in the lid member contacting step.

4. A vacuum insulation glass panel assembly manufacturing apparatus in which edges between glass panels spaced apart at a predetermined interval are sealed by a first sealing agent having a higher melting point, and an exhaust port formed so as to communicate with a space between the glass panels having the sealed edges is sealed by bringing a lid member coated with a second sealing agent having a lower melting point than the first sealing agent into contact with a periphery of the exhaust port, the apparatus comprising:

a first heating chamber configured to heat the glass panel assembly to a temperature at which the first sealing agent having the higher melting point than the second sealing agent is melted;

a second heating chamber configured to heat the glass panel assembly to a temperature at which the first sealing agent having the higher melting point is not melted and the second sealing agent having the lower melting point is melted;

a first vacuum heating chamber configured to form a depressurized state below an atmospheric pressure;

a second vacuum heating chamber connected to the first vacuum heating chamber by a passage and configured to form the depressurized state below the atmospheric pressure;

a lid member closing device including a clamping unit having a guide hole and configured to be fixed to the glass panel assembly, a lid member holder installed in the guide hole so as to move along the guide hole, a lever rotatably mounted on the clamping unit, and an elevating means configured to raise and lower the lid member holder in response to rotational movement of the lever; and a lever pressing member arranged in a passage connecting the first vacuum heating chamber and the second vacuum heating chamber or in the second vacuum heating chamber so that the lever pressing member applies an external force to the lever of the lid member closing device when the glass panel assembly mounted with the lid member closing device is moved from the first vacuum heating chamber to the second vacuum heating chamber.

\* \* \* \* \*